United States Patent
Takabatake et al.

(10) Patent No.: US 10,108,476 B2
(45) Date of Patent: Oct. 23, 2018

(54) SELF DIAGNOSIS METHOD, COMPILE APPARATUS AND COMPILER

(71) Applicant: Renesas Electronics Corporation, Tokyo (JP)

(72) Inventors: Motoyasu Takabatake, Tokyo (JP); Akihiro Yamamoto, Tokyo (JP); Atsushi Nakamura, Tokyo (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 274 days.

(21) Appl. No.: 14/825,739

(22) Filed: Aug. 13, 2015

(65) Prior Publication Data

US 2016/0062812 A1 Mar. 3, 2016

(30) Foreign Application Priority Data

Sep. 2, 2014 (JP) ................. 2014-177795

(51) Int. Cl.
*G06F 11/07* (2006.01)
*G06F 11/22* (2006.01)

(52) U.S. Cl.
CPC ........ *G06F 11/079* (2013.01); *G06F 11/0706* (2013.01); *G06F 11/22* (2013.01)

(58) Field of Classification Search
CPC ............ G06F 11/3433; G06F 11/3419; G06F 11/0739; G06F 9/5077; G06F 9/5016
See application file for complete search history.

(56) References Cited

U.S. PATENT DOCUMENTS

| | | | |
|---|---|---|---|
| 9,317,338 B2* | 4/2016 | Wong | G06F 9/50 |
| 2002/0016757 A1* | 2/2002 | Johnson | G06Q 10/06 705/36 R |
| 2007/0234276 A1* | 10/2007 | Ottoni | G06F 8/314 717/104 |
| 2010/0229161 A1* | 9/2010 | Mori | G06F 8/456 717/149 |
| 2012/0065918 A1* | 3/2012 | Larrasoana Alconero | F03D 11/0091 702/113 |
| 2013/0047142 A1* | 2/2013 | Bates | G06F 8/41 717/140 |

FOREIGN PATENT DOCUMENTS

JP 2013-156745 A 8/2013

\* cited by examiner

*Primary Examiner* — Yolanda L Wilson
(74) *Attorney, Agent, or Firm* — Sughrue Mion, PLLC

(57) ABSTRACT

The execution time of a self diagnosis program is reduced. A compiler apparatus includes: a specify unit that specifies, out of a plurality of resources included in a diagnosis target apparatus, a use resource group being a set of resources used by an instruction string included in an object program executed on the diagnosis target apparatus; a determine unit that determines, in accordance with the specified use resource group, a target resource group being a set of resources to be targets of a self diagnosis in the diagnosis target apparatus; and an output unit that outputs, for causing the self diagnosis on the determined target resource group to be executed in the diagnosis target apparatus, information based on the target resource group to the diagnosis target apparatus.

13 Claims, 21 Drawing Sheets

| INSTRUCTION | DIVISION ID |
|---|---|
| opA | 5, 6, 9, 10 |
| opB | 3, 4, 7, 8, 11, 12 |
| opC | 10, 11, 14, 15 |
| opD | 9, 10, 13, 14 |
| opE | 13, 14, 15 |
| opF | 14, 15, 16 |
| .... | ... | opA = {5, 6, 9, 10}    opB = {3, 4, 7, 8, 11, 12}    opC = {10, 11, 14, 15}
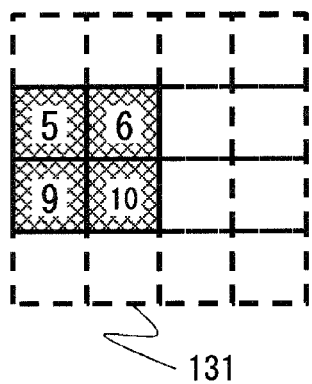
~ 131
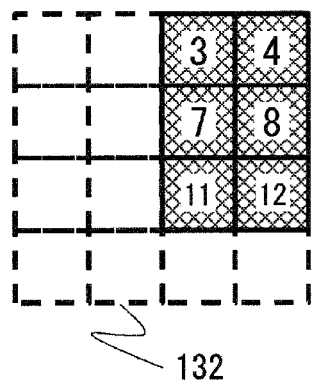
~ 132
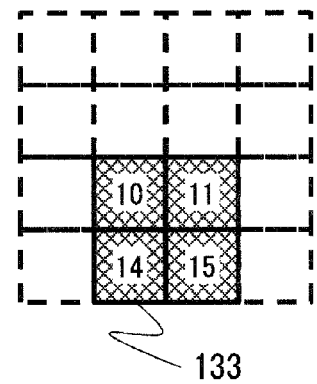
~ 133
opD = {8, 9, 13, 14}    opE = {13, 14, 15}    opF = {14, 15, 16}
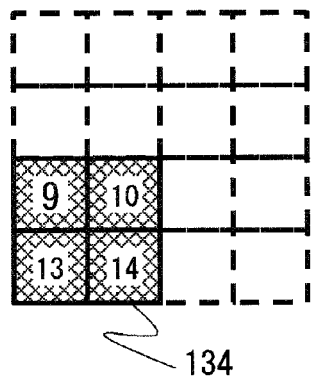
~ 134
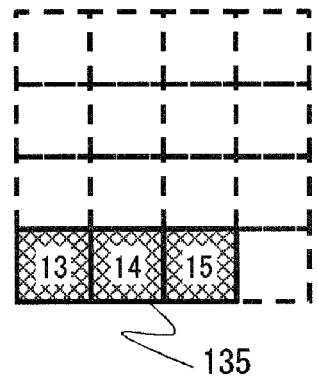
~ 135
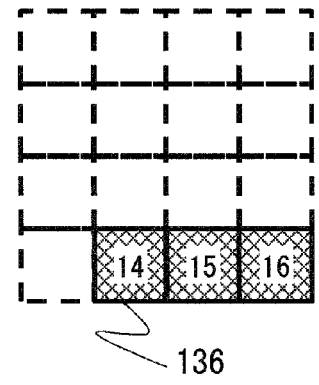
~ 136
Fig. 4

| TEST ID | DIVISION ID |
|---|---|
| T1 | 1, 2, 5, 6 |
| T2 | 5, 6, 7, 9, 10, 11, 13, 14, 15 |
| T3 | 3, 4, 7, 8, 11, 12 |
| T4 | 13, 14, 15, 16 |

DIVISION OF SELF DIAGNOSIS PROGRAM

```
Test() {
   if(T1) testA();
   if(T2) testB();
   if(T3) testC();
   if(T4) testD();
}
```
~ 16

```
Test ={T1:testA, T2:testB,
       T3:testC, T4:testD}
```
~ 16X

Fig. 7

OBJECT PROGRAM
INSTRUCTION STRING

| opA |
| opB |
| opC |
| opD |
| opE |
| opF |

~ 120

USE DIVISION ID SET
= {3, 4, 5, 6, 7, 8, 9, 10,
11, 12, 13, 14, 15, 16}

|  |  | 3 | 4 |
|---|---|---|---|
| 5 | 6 | 7 | 8 |
| 9 | 10 | 11 | 12 |
| 13 | 14 | 15 | 16 |

~ 120US

TEST SET
= {T2, T3, T4}   ~ 120TS

TEST DIVISION ID SET
= {3, 4, 5, 6, 7, 8, 9, 10,
11, 12, 13, 14, 15, 16}   ~ 120TIS

Fig. 9

| TEST ID | TEST | EXECUTION TIME (nsec) |
|---------|-------|----------------------|
| T1 | TestA | 10 |
| T2 | TestB | 5 |
| T3 | TestC | 20 |
| T4 | TestD | 15 |

OBJECT PROGRAM
INSTRUCTION STRING opB
opE                 — 170

USE DIVISION ID SET
= {3, 4, 7, 8, 13, 14, 15}         — 170US

TEST SET INCLUDING USE DIVISION ID SET
BY THRESHOLD VALUE OR MORE
  SET A : {T2, T3} → EXECUTION TIME  5+20 =25
  SET B : {T3, T4} → EXECUTION TIME  20+15=35         — 171

Fig. 18

| DIVISION ID | SIGNIFICANCE DEGREE |
|---|---|
| 1 | 25 |
| 2 | 95 |
| ... | ... |
| 9 | 30 |
| 10 | 20 |
| ... | ... |
| 16 | 60 |

OBJECT PROGRAM
INSTRUCTION STRING

| opB |
| opD |
| opF |
| opC |

— 180

USE DIVISION ID SET
= {3, 4, 7, 8, 9, 10, 11, 12, 13, 14, 15, 16}    — 180US

TEST SET INCLUDING USE DIVISION ID SET BY 80% OR MORE

SET C: {T2, T3}
→ TEST DIVISION ID SET C1:      {3, 4, 5, 6, 7, 8, 9, 10, 11, 12, 13, 14, 15}
→ EFFECTIVE DIVISION ID SET C2: {3, 4,       7, 8, 9, 10, 11, 12, 13, 14, 15}
→ SIGNIFICANCE DEGREE: 390
— 181

SET D: {T3, T4}
→ TEST DIVISION ID SET D1:      {3, 4, 7, 8, 11, 12, 13, 14, 15, 16}
→ EFFECTIVE DIVISION ID SET D2: {3, 4, 7, 8, 11, 12, 13, 14, 15, 16}
→ SIGNIFICANCE DEGREE: 400
— 182

Fig. 21

SELF DIAGNOSIS METHOD, COMPILE APPARATUS AND COMPILER

CROSS-REFERENCE TO RELATED APPLICATIONS

This application is based upon and claims the benefit of priority from Japanese patent application No. 2014-177795, filed on Sep. 2, 2014, the disclosure of which is incorporated herein in its entirety by reference.

BACKGROUND

Technical Field

The present invention relates to a self diagnosis method, a compile apparatus, and a non-transitory computer readable medium storing a compiler program. The present invention relates to, for example, a self diagnosis method, a compile apparatus, and a non-transitory computer readable medium storing a compiler program, each for causing an apparatus executing a program to perform a self diagnosis.

Background Art

In the field where importance is placed on functional safety, such as in-vehicle apparatuses, detection of a failure is continuously performed by causing a processor to execute a self diagnosis program at arbitrary timing.

For example, Patent Literature 1 (Japanese Unexamined Patent Application Publication No. 2013-156745) discloses the following technique. A program created by the user (e.g., a user program) and a program not created by the user (e.g., a self diagnosis program) are alternately executed by scheduling. When any error is detected by the self diagnosis program, execution of both the programs is suppressed.

SUMMARY

Patent Literature 1 has a problem that, when the execution time of the self diagnosis program is long, the time allotted to the user program becomes relatively short. Accordingly, there is a necessity for reducing the execution time of the self diagnosis program.

Other problems and novel features will become apparent from the description of the present specification and the accompanying drawings.

According to an embodiment, a self diagnosis program is executed on a resource group used by an instruction string included in an object program executed on an apparatus.

Note that, a method or a system replacing the apparatus in the embodiment noted above, a program causing a computer to execute part of or all the processes of the apparatus, and an imaging apparatus including the apparatus are also effective as embodiments of the present invention.

According to the one embodiment, the execution time of the self diagnosis program can be reduced.

BRIEF DESCRIPTION OF THE DRAWINGS

The above and other aspects, advantages and features will be more apparent from the following description of certain embodiments taken in conjunction with the accompanying drawings, in which:

FIG. 4 is a diagram showing an example of correspondence between instructions and resources used by the instructions according to the first embodiment;

FIG. 5 is a diagram showing an example of a test-resource correspondence table according to the first embodiment;

FIG. 6 is a diagram showing an example of regions in a range of a self diagnosis for each test item according to the first embodiment;

FIG. 7 is a diagram showing an example of division of a self diagnosis program according to the first embodiment;

FIG. 9 is a diagram showing an example of an instruction string of an object program, a use division ID set, and a test set according to the first embodiment;

FIG. 18 is a diagram showing an example of output test sets according to the fourth embodiment;

FIG. 19 is a diagram showing an example of a correspondence table of division IDs and significance degrees according to a fifth embodiment;

FIG. 21 is a diagram showing an example of output test sets according to the fifth embodiment.

DETAILED DESCRIPTION

Figure 1:
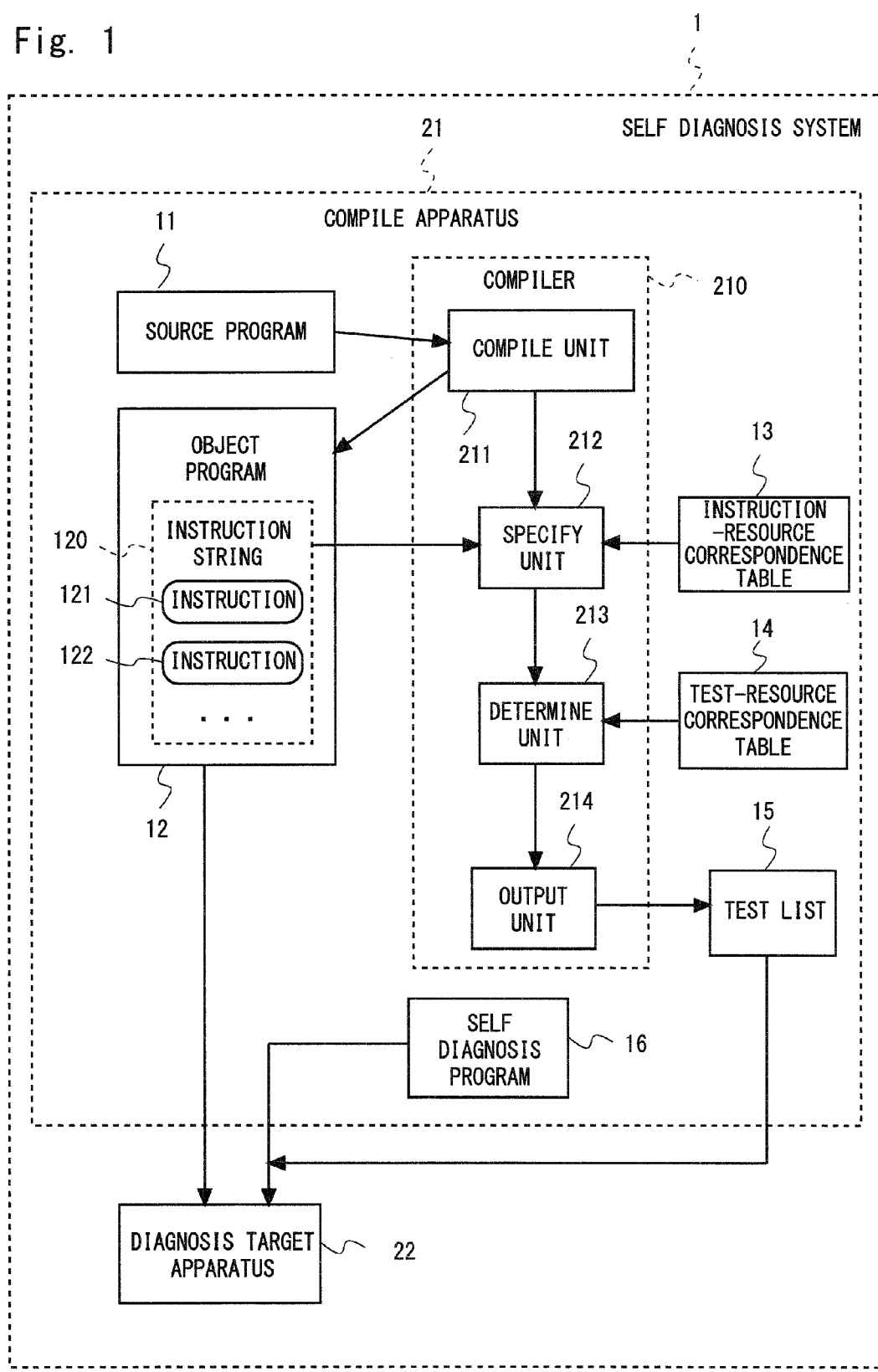
FIG. 1 is a block diagram showing the structure of a self diagnosis system according to a first embodiment.

In the following, with reference to the drawings, a detailed description will be given of specific embodiments to which means for solving the problem stated above are applied. Throughout the drawings, identical reference characters are allotted to identical elements, and repetitive descriptions are omitted as necessary for the sake of clarity.

In the following embodiments, the invention will be described in a plurality of sections or embodiments when required for the sake of convenience. However, these sections or embodiments are not unrelated to one another unless otherwise stated. One of these sections or embodiments relates to part of or the entire other sections or embodiments as a modification, an application, details, or a supplementary explanation. Also, in the following embodiments, when a reference is made to the number or the like of elements (including the number of pieces, numerical values, amount, range and the like), the present invention is not limited to such a specific number unless otherwise stated or unless the number of the elements is apparently limited to such a specific number on principle, and the number of the elements may be greater or smaller than that specific number.

Further, in the following embodiments, the constituent elements (including operation steps and the like) are not always essential unless otherwise stated or unless they are apparently essential on principle. Similarly, in the following embodiments, when a reference is made to the shape or positional relationship of the constituent elements, a substantially approximate or similar shape or the like is included unless otherwise stated or unless it apparently may not hold on principle. The same holds true for the above-noted numbers or the like (including the number of pieces, numerical values, amounts, ranges and the like).

Here, the above-described problem will be further described. Normally, an in-vehicle processor or the like is required to execute a self diagnosis program every 100 msec. Accordingly, as in Patent Literature 1, in the case where the self diagnosis program and an user program are to be executed alternately by scheduling, when the execution time of the self diagnosis program becomes excessively long, the time allotted to the processing of the user program becomes short. That is, there is a problem that only a user program with short processing time can be used, and hence the limitation is great.

Therefore, a description will be given of the structure common to the following embodiments, an object of which is to reduce the execution time of the self diagnosis program. That is, a self diagnosis method according to the present embodiment includes: specifying, out of a plurality of resources included in a diagnosis target apparatus, a use resource group being a set of resources used by an instruction string included in an object program executed on the diagnosis target apparatus; determining, in accordance with the specified use resource group, a target resource group being a set of resources to be targets of a self diagnosis in the diagnosis target apparatus; and executing the self diagnosis on the determined target resource group. Thus, the self diagnosis program is executed on not all but part of the resources included in the diagnosis target apparatus, and hence the execution time of the self diagnosis program can be reduced.

Further, the self diagnosis method desirably further includes: previously defining, on the plurality of resources, a plurality of functional blocks being a set of resources respectively corresponding to a plurality of functions in the diagnosis target apparatus; and determining, out of combinations of the plurality of functional blocks, the target resource group in accordance with the specified use resource group. For example, it is assumed that self diagnosis processes on all the functional blocks are implemented in a self diagnosis program, so as to be selectively executed for each of the functional blocks. In this manner, by setting the target of the self diagnosis on a functional block-by-functional block basis, the necessity of generating a self diagnosis program for each object program is eliminated, and the self diagnosis program can be effectively used.

Further, a compile apparatus according to the present embodiment includes: a specify unit that specifies, out of a plurality of resources included in a diagnosis target apparatus, a use resource group being a set of resources used by an instruction string included in an object program executed on the diagnosis target apparatus; a determine unit that determines, in accordance with the specified use resource group, a target resource group being a set of resources to be targets of a self diagnosis in the diagnosis target apparatus; and an output unit that outputs, for causing the self diagnosis on the determined target resource group to be executed in the diagnosis target apparatus, information based on the target resource group to the diagnosis target apparatus.

Alternatively, a non-transitory computer readable medium storing a compiler program according to the present embodiment for causing a computer to execute processes of: generating an object program executed on a diagnosis target apparatus; specifying, out of a plurality of resources included in the diagnosis target apparatus, a use resource group being a set of resources used by an instruction string included in the object program; determining, in accordance with the specified use resource group, a target resource group being a set of resources to be targets of a self diagnosis in the diagnosis target apparatus; and outputting, for causing the self diagnosis on the determined target resource group to be executed in the diagnosis target apparatus, information based on the target resource group to the diagnosis target apparatus.

(First Embodiment)

In a first embodiment of the present invention, the self diagnosis method described above further includes determining, as the target resource group, out of the combinations of the plurality of functional blocks, a combination including all the resources belonging to the use resource group and still being made up of a smallest number of the resources. In this manner, since all the resources included in the instruction string and still being a minimum are the targets of the diagnosis, an effective self diagnosis can be executed.

<Structure of Self Diagnosis System>

FIG. 1 is a block diagram showing the structure of a self diagnosis system 1 according to the first embodiment. Note that, the self diagnosis system 1 can also be referred to as a compiler system. The self diagnosis system 1 includes a compile apparatus 21 and a diagnosis target apparatus 22. The diagnosis target apparatus 22 is a processor or the like, and is an apparatus being the target of a self diagnosis. The diagnosis target apparatus 22 is an apparatus that can at least execute a user program. The diagnosis target apparatus 22 may be, for example, an in-vehicle apparatus, but is not limited thereto.

Figure 2:
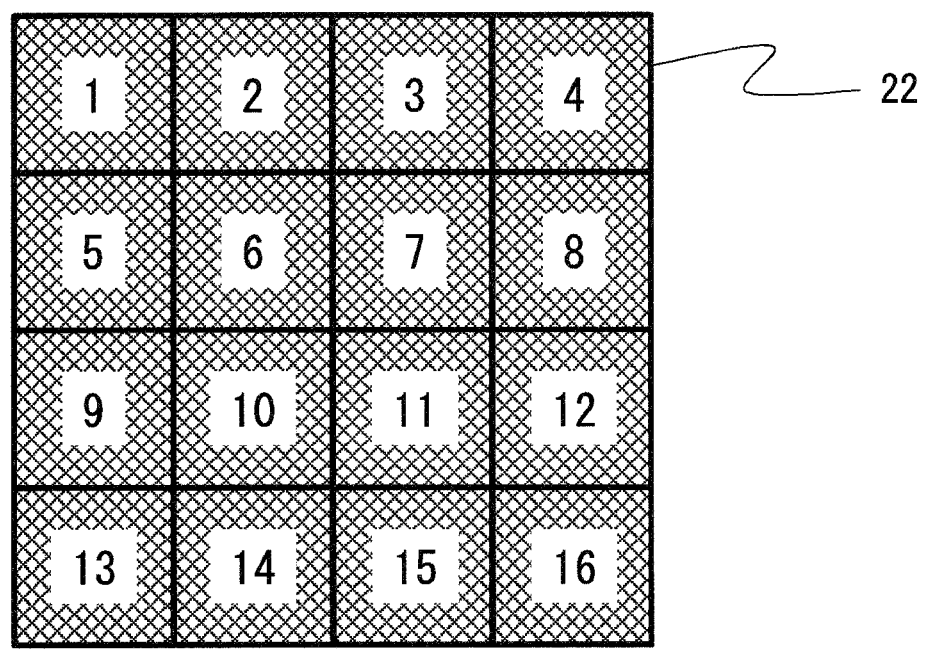
FIG. 2 is a diagram showing an example of region division in a diagnosis target apparatus according to the first embodiment.

In the first embodiment, the diagnosis target apparatus 22 is divided into a plurality of regions, and the regions are provided with division IDs being identification information. FIG. 2 is a diagram showing an example of region division in the diagnosis target apparatus 22 according to the first embodiment. In the example of FIG. 2, the diagnosis target apparatus 22 is equally divided into sixteen regions. Then, in the following, the description will be given regarding the numbers 1 to 16 in FIG. 2 as the division IDs.

Here, the "region" is a set of a plurality of resources included in the diagnosis target apparatus 22. A resource may be, for example, a circuit element of a logic circuit in the diagnosis target apparatus 22. Therefore, each region can be represented by a unit of a transistor, an operational unit, a register, memory or the like. That is, the region should be structured by at least one circuit element. Note that, the region should be a set of wired transistors. That is, the transistors not physically arranged adjacent to each other can be defined as an identical region.

The description continues referring back to FIG. 1. A compiler 210 included in the compile apparatus 21 receives a source program 11, an instruction-resource correspondence table 13, and a test-resource correspondence table 14, and outputs an object program 12 and a test list 15.

<Description of Input and Output Data>

Here, the source program 11 is a source program in which a user program for being executed on the diagnosis target apparatus 22 is implemented. The object program 12 is a machine language program obtained by compilation of the source program 11. That is, the object program 12 is an object program executed on the diagnosis target apparatus 22. The object program 12 includes an instruction string 120. The instruction string 120 includes a plurality of instructions 121, 122 . . . . Here, the instruction 121 and others are defined on the diagnosis target apparatus 22, for causing a particular process to be executed using a set of a plurality of resources included in the diagnosis target apparatus 22. In other words, the instruction 121 and others uses one or more region provided with the division ID described above. Note that, the user program is created by the user for a particular object. Accordingly, the user program does not use all the functions of the diagnosis target apparatus 22. Then, in the present embodiment, it is assumed that the instruction string included in the object program 12 includes not every but part of the entire instructions defined on the diagnosis target apparatus 22. That is, even when the object program 12 is executed on the diagnosis target apparatus 22, part of the regions of the diagnosis target apparatus 22 is used, and not the entire regions are used.

Figure 3:
FIG. 3 is a diagram showing an example of an instruction-resource correspondence table according to the first embodiment.

The instruction-resource correspondence table 13 is a correspondence table in which a plurality of instructions 121 and others defined on the diagnosis target apparatus 22, and sets of resources (the division IDs) respectively used by the instructions are associated with each other. FIG. 3 is a diagram showing an example of the instruction-resource correspondence table 13 according to the first embodiment. This shows that the correspondence between instructions opA, opB, opC, opD, opE, opF and division IDs respectively used by the instructions are defined. Further, FIG. 4 is a diagram showing an example of correspondence between the instructions and the resources (the regions, the divisions IDs) respectively used by the instructions according to the first embodiment. For example, FIG. 4 shows that, when the diagnosis target apparatus 22 executes the instruction opA (131), the regions corresponding to the division IDs "5", "6", "9", and "10" are used. The same holds true for the instructions opB to opF (132 to 136)

The description continues referring back to FIG. 1. The test-resource correspondence table 14 is a correspondence table in which test IDs identifying test items for the diagnosis target apparatus 22 and the division IDs are associated with each other. A test item is a unit for testing a specific function in the diagnosis target apparatus 22. That is, the test item can also be regarded as a functional block unit. Accordingly, by executing a test module in which a diagnosis process corresponding to a test item is implemented on the diagnosis target apparatus 22, the region corresponding to the division ID associated with the test item can be diagnosed. FIG. 5 is a diagram showing an example of the test-resource correspondence table 14 according to the first embodiment. Further, FIG. 6 is a diagram showing an example of regions in the range of a self diagnosis for each test item according to the first embodiment. A test ID T1 (141) is associated with the division IDs "1", "2", "5", and "6". That is, the test ID T1 can be regarded as the test item for the regions corresponding to the division IDs "1", "2", "5", and "6. The same holds true for test IDs T2 to T4 (142 to 144). Note that, the test-resource correspondence table 14 represents the definition of the functional blocks noted above.

The description continues referring back to FIG. 1.

A self diagnosis program 16 includes implementation for testing all the regions in the diagnosis target apparatus 22. In particular, the self diagnosis program 16 according to the present embodiment is divided into a plurality of test modules (e.g., functions), each associated with the above-described test ID. FIG. 7 is a diagram showing an example of division of the self diagnosis program 16 according to the first embodiment. Further, 16X in FIG. 7 represents the correspondence between the test IDs and the test functions. The self diagnosis program 16 executes test functions testA( ) to testD( ) when execution of test IDs T1 to T4 is specified, respectively. Here, the test functions testA( ) to testD( ) are each implemented for carrying out a diagnosis of the regions corresponding to the division IDs defined in the test-resource correspondence table 14. For example, when the test ID T1 is specified as the execution target, the test function testA( ) is executed, and thus the regions corresponding to the division IDs "1", "2", "5", and "6" can be diagnosed. The same holds true for the test functions testB( ) to testD( ). However, implementation of the self diagnosis program is not limited thereto. Note that, the instruction-resource correspondence table 13 and the test-resource correspondence table 14 are previously defined. Further, the self diagnosis program 16 may be previously created based on the test-resource correspondence table 14.

The description continues referring back to FIG. 1.

The test list 15 is a list of the test IDs to be the self diagnosis targets in the present embodiment. The test list 15 is output from the compiler 210. Then, the test list 15 is input to the diagnosis target apparatus 22. The test list 15 is used for specifying the targets of execution of the self diagnosis program 16 described above. Note that, the test list 15 is an example of information based on a target resource group, for causing a self diagnosis on the target resource group to be executed in the diagnosis target apparatus 22.

<Structure of Compiler>

The compiler 210 includes a compile unit 211, a specify unit 212, a determine unit 213, and an output unit 214. The compile unit 211 receives and complies the source program 11, and outputs the result as the object program 12. That is, the compile unit 211 converts the source program 11 into a machine language and generates and outputs the object program 12.

The specify unit 212 specifies a use resource group which is a set of resources used by the instruction string 120 included in the object program 12, out of a plurality of resources (regions) included in the diagnosis target apparatus 22. Specifically, the specify unit 212 extracts the instructions 121, 122, . . . from the object program 12, and specifies a set of division IDs (the use division ID set, the use resource group) corresponding to the instructions, with reference to the instruction-resource correspondence table 13. In this manner, through use of the instruction-resource correspondence table 13, the specify unit 212 can efficiently specify the use resource group out of whole the regions.

The determine unit 213 determines a target resource group which is a set of resources to be the target to of a self diagnosis by the diagnosis target apparatus 22, in accordance with the use resource group specified by the specify unit 212. Specifically, the determine unit 213 determines a target resource group corresponding to the use resource group, out of a plurality of combinations of the test IDs (functional blocks). In particular, the determine unit 213 according to the present embodiment determines, as the target resource group, a combination including all the resources belonging to the use resource group and still being made up of the smallest number of resources, out of a plurality of combinations of the test IDs.

Further, it can also be recognized that, the determine unit 213 determines, as the target resource group, a combination in which the number of resources not belonging to the use resource group is the smallest, out of a plurality of combinations of the test IDs. Thus, the regions not used in the object program which is executed after the self diagnosis can be excluded from the self diagnosis targets. Thus, the efficiency of the self diagnosis can be improved.

In order to cause the self diagnosis on the determined target resource group to be executed in the diagnosis target apparatus 22, the output unit 214 outputs the information based on the target resource group to the diagnosis target apparatus 22. In particular, the output unit 214 according to the present embodiment outputs the test list 15, as the information based on the target resource group for causing the self diagnosis on the determined target resource group to be executed.

As described above, in the present embodiment, along with the compilation of the object program, the target resource group is determined using the instruction string generated by such compilation. Thus, the self diagnosis target can be efficiently determined. Alternatively, after the compilation of the object program, the target resource group can be separately determined.

<Process Flow>

Figure 8:
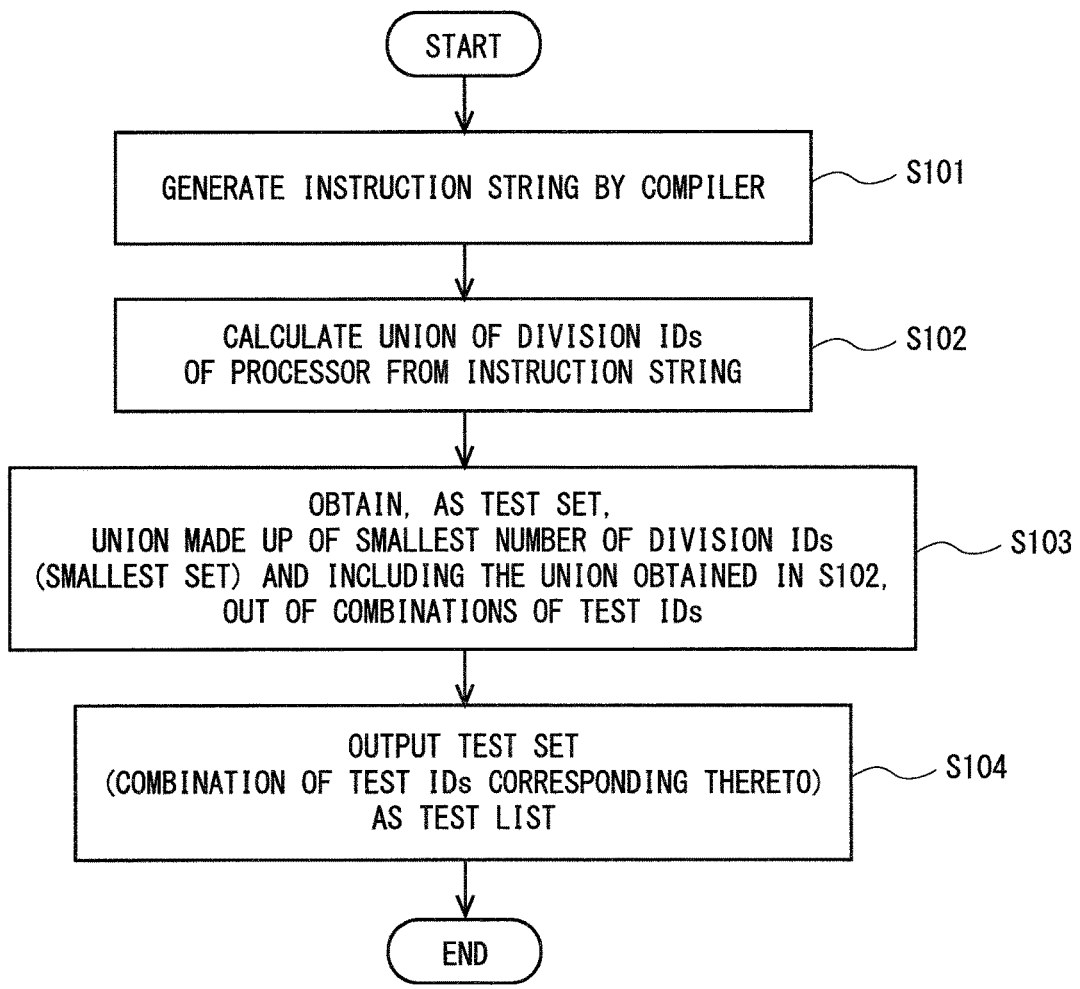
FIG. 8 is a flowchart showing the flow of processes performed by a compiler according to the first embodiment.

FIG. 8 is a flowchart showing the flow of the processes performed by the compiler according to the first embodiment. Firstly, the compile unit 211 generates the object program 12 including the instruction string 120, by compiling the source program 11 (S101). Next, the specify unit 212 obtains all the resources used when the object program 12 is executed on the diagnosis target apparatus 22 (the processor). Specifically, the specify unit 212 collates the instructions included in the instruction string 120 with the instruction-resource correspondence table 13, and reads lists of the associated division IDs. Then, the specify unit 212 calculates a union from the read division ID lists (S102). That is, the specify unit 212 obtains the union (the use division ID set) of the division IDs associated with the instructions included in the instruction string 120 as the use resource group.

Subsequently, the determine unit 213 obtains, as a test set (the target resource group), the smallest set among those including the use division ID set, out of the combinations of the test IDs (S103). Here, the "smallest set" refers to the set in which the number of the division IDs is the smallest among the sets of division IDs that correspond to the combinations of the test IDs. Specifically, firstly, the determine unit 213 refers to the test-resource correspondence table 14, and obtains a union of the division IDs for every combination of the test IDs. Then, the determine unit 213 narrows the obtained unions to include all the division IDs included in the union calculated in Step S102 (to obtain the candidate (s) of the test set). Here, a plurality of unions may correspond to the candidates of the test set. Therefore, a union made up of the smallest number of division IDs is obtained as the smallest set, out of the narrowed test set candidates. That is, the determine unit 213 determines the smallest set as the test set (the target resource group).

Thereafter, the output unit 214 outputs a combination of test IDs corresponding to the test set obtained in Step S103 as the test list 15 (S104).

<Specific Example>

FIG. 9 is a diagram showing an example of the instruction string of the object program, the use division ID set (the use resource group), and the test set (the target resource group). Firstly, in Step S101, it is assumed that the instruction string 120 is included in the object program 12 generated by the compile unit 211. In this case, in Step S102, the specify unit 212 obtains a union of the division IDs (the use division ID set) 120US used by the instruction string 120, from the instruction-resource correspondence table 13 of FIG. 7. Then, in Step S103, the determine unit 213 obtains, out of a plurality of unions corresponding to a plurality of combinations of the test IDs, the smallest set (a test set 120TS, a test division ID set 120TIS) among those including the use division ID set 120US (the test set candidates). That is, in this example, the test set 120TS {T2, T3, T4} is output as the test list 15. Note that, though FIG. 9 shows the case where the division IDs are equal between the use division ID set (the use resource group) 120US and the test division ID set (the target resource group) 120TIS, the test division ID set should include at least the use division ID set.

Thereafter, the diagnosis target apparatus 22 executes the self diagnosis program 16 using the test list 15 as the input, before executing the object program 12. That is, the diagnosis target apparatus 22 executes the test functions in the self diagnosis program 16 for the test IDs specified in the test list 15. Accordingly, the self diagnosis is performed only for the regions included in the test set. For example, since the diagnosis target apparatus 22 uses the test list 15 of {T2, T3, T4} as the input of the self diagnosis program 16, only testB( ), testC( ), and testD( ) are executed. On the other hand, testA( ) corresponding to T1 not included in the test list 15 is not executed.

<Effect of First Embodiment>

Accordingly, in contrast to the case where all the test functions are executed by the self diagnosis program 16, since just part of the test functions is executed in the first embodiment, the execution time of the self diagnosis program 16 can be reduced. That is, in the first embodiment, just the resources actually used in the user program executed immediately after compilation can be checked by the self diagnosis program 16, based on the instruction string 120 generated by the compiler 210. Therefore, the execution time of the self diagnosis program can be reduced while securing the error detection precision in the self diagnosis.

Note that, the self diagnosis execution time is not always determined solely by the number of target circuit elements (the number of regions). For example, the execution time may be the shortest even when the number of regions is relatively great. Therefore, the first embodiment (the number of regions is the smallest) is merely an example.

<Example of Hardware Structure>

Figure 10:
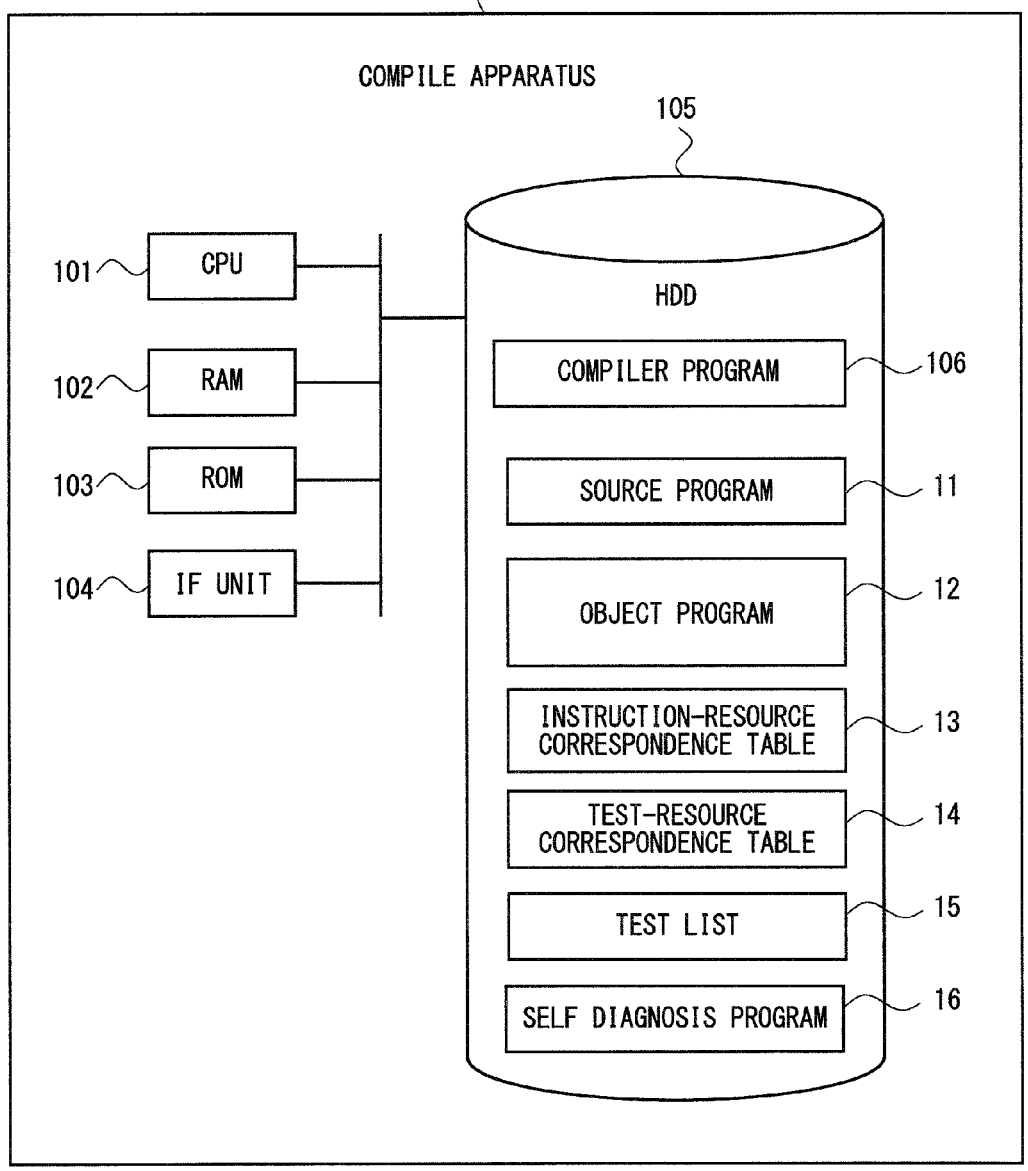
FIG. 10 is a block diagram showing the hardware structure of a compile apparatus according to the first embodiment.

FIG. 10 is a block diagram showing the hardware structure of the compile apparatus 21 according to the first embodiment. The compile apparatus 21 can be realized by, for example, a general-purpose computer system. The compile apparatus 21 includes, for example, a control apparatus such as a CPU (Central Processing Unit) 101, memory such as RAM (Random Access Memory) 102 and ROM(Read Only Memory) 103, an IF unit 104, and a HDD (Hard Disk Drive) 105. While not shown, the compile apparatus 21 may include an input apparatus such as a keyboard and a mouse, and a display apparatus such as a display. The IF unit 104 is an interface that externally transmits and receives data via the input apparatus, the display apparatus, and network.

The HDD 105 stores an OS (Operating System) (not shown), a compiler program 106, the source program 11, the object program 12, the instruction-resource correspondence table 13, the test-resource correspondence table 14, the test list 15, and the self diagnosis program 16. The compiler program 106 is a computer program in which the processes of the compiler 210 according to the first embodiment are implemented.

The CPU 101 controls various processes at the compile apparatus 21, and access and the like to the RAM 102, the ROM 103, the IF unit 104, and the HDD 105. In the compile apparatus 21, the CPU 101 reads the OS and the compiler program 106 stored in the HDD 105 and executes the program. Thus, the compile apparatus 21 realizes the processes of the compiler 210 according to the first embodiment.

(Second Embodiment)

A second embodiment is a variation of the first embodiment described above. In the second embodiment, a self diagnosis program is generated in accordance with the determined target resource group. That is, a plurality of program modules are previously defined for performing the self diagnosis on the plurality of functional blocks, respectively. Out of the plurality of program modules, a program module corresponding to the determined target resource group is selected. Based on the selected program module, a self diagnosis program for executing the self diagnosis is generated. Thus, the size of the self diagnosis program can be reduced, and the occupation rate in the memory in the diagnosis target apparatus can be reduced.

<Structure of Self Diagnosis System>

Figure 11:
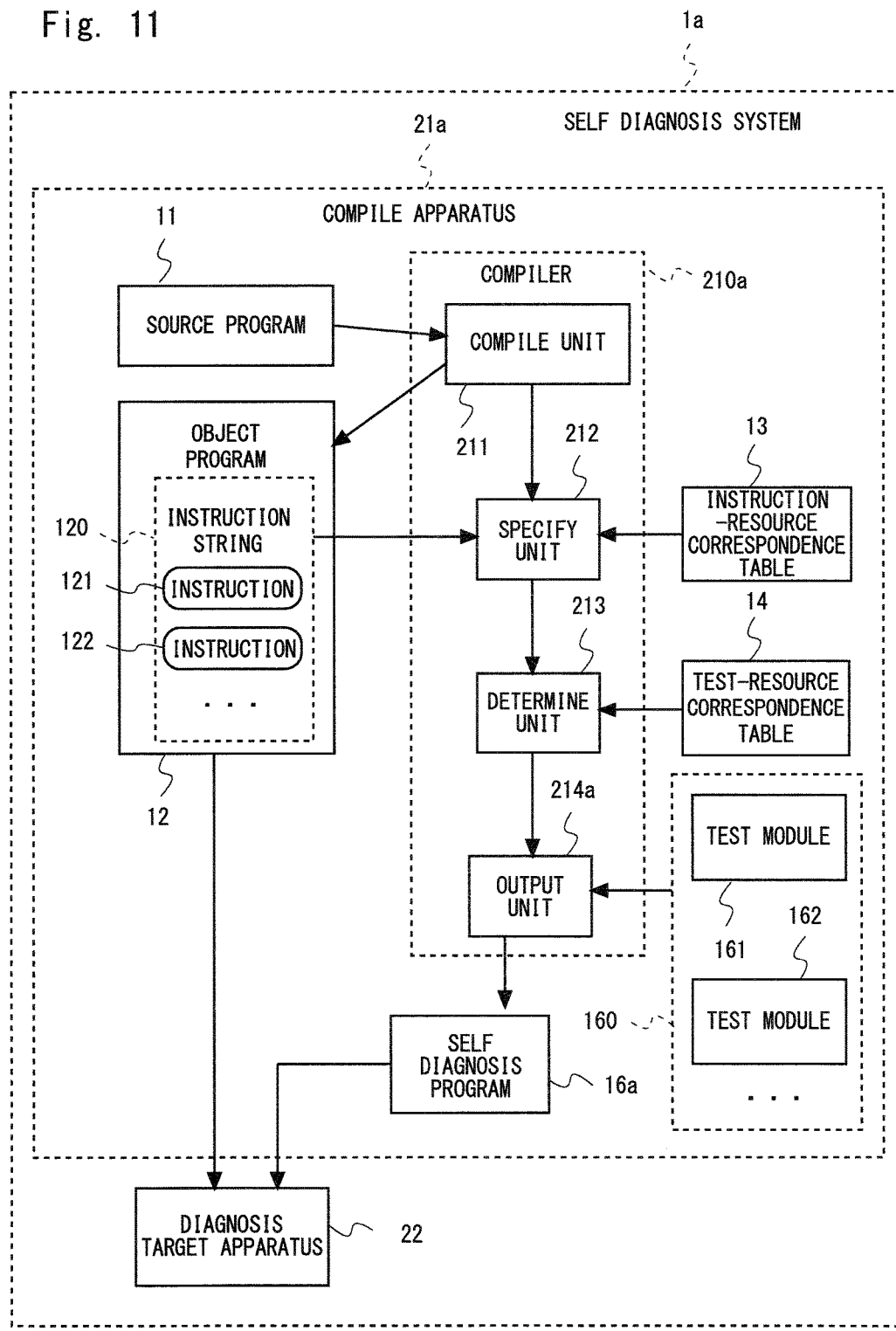
FIG. 11 is a block diagram showing the structure of a self diagnosis system according to a second embodiment.

FIG. 11 is a block diagram showing the structure of a self diagnosis system 1a according to the second embodiment. The self diagnosis system 1a is different from the self diagnosis system 1 according to the first embodiment in that the compile apparatus 21, the compiler 210, and the output unit 214 are replaced by a compile apparatus 21a, a compiler 210a, and an output unit 214a, respectively. Further, it is assumed that a test module group 160 in which diagnosis processes corresponding to a plurality of test items are implemented is previously defined. The test module group 160 includes a plurality of test modules (program modules) 161, 162 . . . . The test module 161 and others correspond to, for example, the above-described test functions testA( ) to testD( ) and others.

The compiler 210a is similar to the compiler 210 shown in FIG. 1 except for the output unit 214a. The output unit 214a selects, out of the test module group 160, at least one of test modules corresponding to a combination of functional blocks, respectively, corresponding to the target resource group determined by the determine unit 213, and generates and outputs a self diagnosis program 16a based on the selected test module. Therefore, in the self diagnosis program 16a, the self diagnosis process for the region corresponding to the target resource group is implemented, among the regions in the diagnosis target apparatus 22. That is, in the self diagnosis program 16a, the self diagnosis process for the entire regions in the diagnosis target apparatus 22 is not implemented. Hence, as compared to the self diagnosis program 16, the self diagnosis program 16a is small in size. Note that, the self diagnosis program 16a is an example of the information based on the target resource group for causing the self diagnosis on the target resource group to be executed in the diagnosis target apparatus 22. Other structure is similar to that shown in FIG. 1 and, therefore, a detailed description is not repeated.

<Process Flow>

Figure 12:
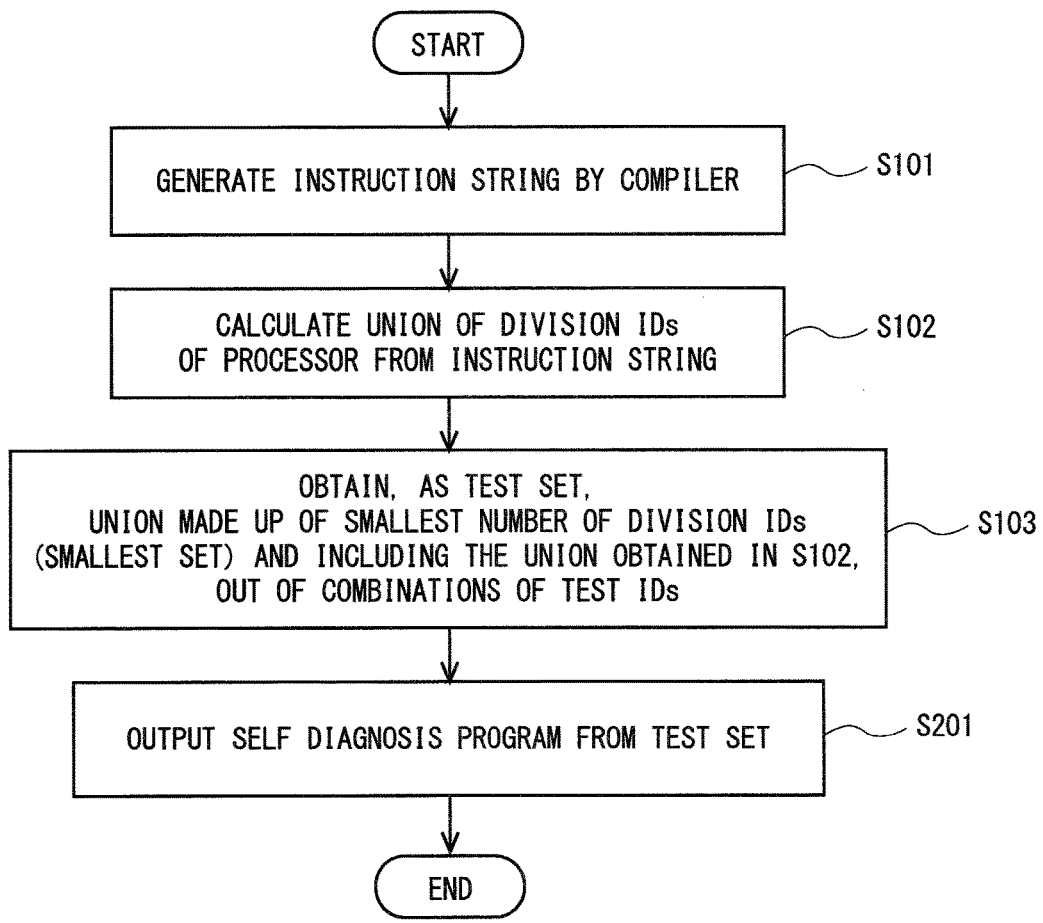
FIG. 12 is a flowchart showing the flow of the processes performed by a compiler according to the second embodiment.

FIG. 12 is a flowchart showing the flow of the processes performed by the compiler according to the second embodiment. FIG. 12 is different from FIG. 4 according to the first embodiment in that Step S104 is replaced by Step S201. That is, the output unit 214a selects, from the test module group 160, test modules corresponding to a combination of test IDs corresponding to the smallest set obtained in Step S103. Then, the output unit 214a generates the self diagnosis program 16a by combining the selected test modules, and outputs the generated self diagnosis program 16a (S201). For example, as shown in FIG. 9, when {T2, T3, T4} is determined as the test set 120TS, the output unit 214a selects test modules corresponding to testB( ), testC( ), and testD( ) from the test module group 160, generates the self diagnosis program 16a by combining them, and outputs the generated self diagnosis program 16a.

<Specific Example>

Figure 13:
FIG. 13 is a diagram showing an example of a generated self diagnosis program according to the second embodiment.

FIG. 13 is a diagram showing an example of the generated self diagnosis program 16a according to the second embodiment. In the self diagnosis program 16a, only testB( ), testC( ), and testD( ) are implemented. Accordingly, when the self diagnosis program 16a is executed on the diagnosis target apparatus 22, similarly to the first embodiment, only testB( ), testC( ), and testD( ) are executed, and testA( ) is not executed. Therefore, similarly to the first embodiment, the self diagnosis execution time can be reduced.

<Effect of Second Embodiment>

As described above, in the second embodiment, the self diagnosis program is generated during compilation. Accordingly, in contrast to the first embodiment, there is no process of reading the test list in executing the self diagnosis program. Further, there is no process of selecting tests to be executed from the test list. Therefore, the execution time of the self diagnosis program can be further reduced than the first embodiment.

(Third Embodiment)

A third embodiment is a variation of the first embodiment described above. In the third embodiment, not whole the specified use resource group but a set including at least a prescribed number of resources is determined as the target resource group. That is, out of the combinations of the plurality of functional blocks, a combination including the resources belonging to the use resource group by a prescribed proportion is determined as the target resource group. Then, for example, by determining a union including the use resource group by 90% or more as the test set, the requirement for the general functional safety can be secured.

<Structure of Compiler>

The compiler 210 according to the third embodiment can be realized by modifying the determine unit 213. Then, the threshold value of included resources out of the resources (the regions, the division IDs) included in the use resource group is previously set. The set threshold value is for example 90%, but the threshold value is not limited thereto. For example, in place of the proportion, the number of the division IDs may be used.

<Process Flow>

Figure 14:
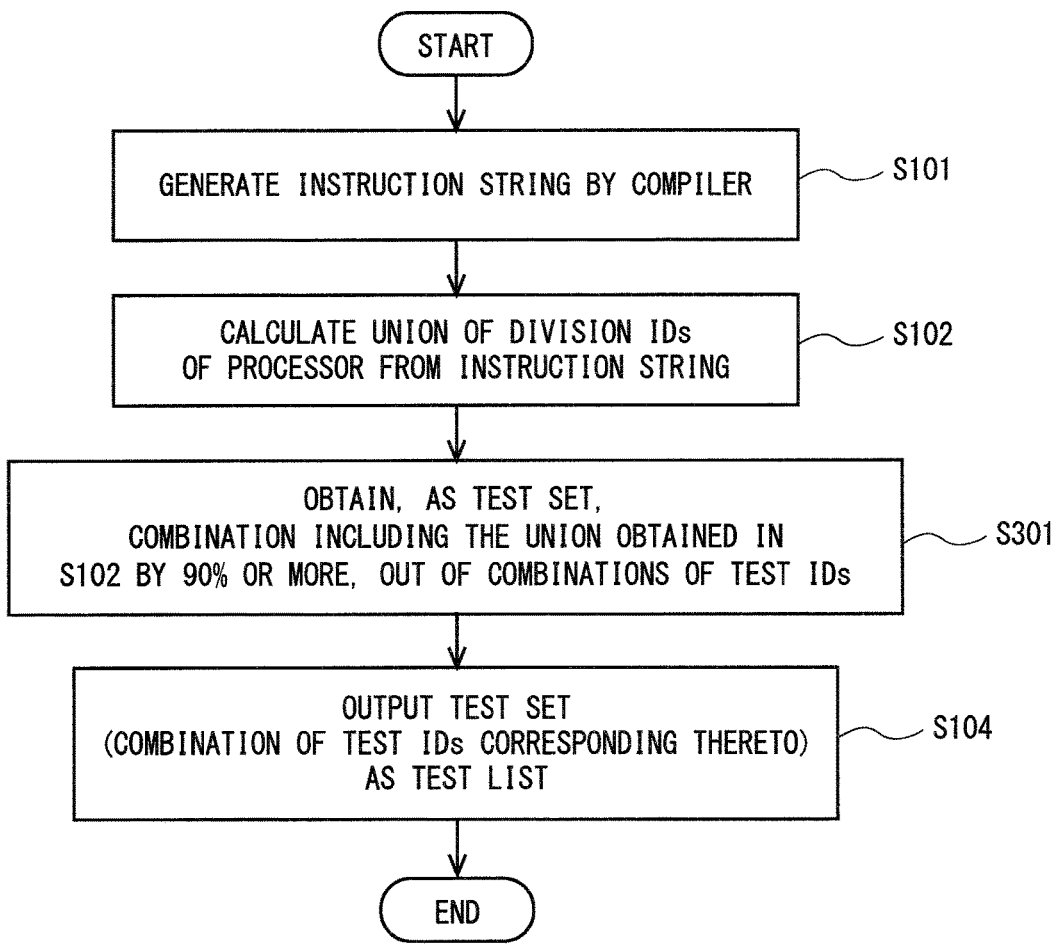
FIG. 14 is a flowchart showing the flow of the processes performed by a compiler according to a third embodiment.

FIG. 14 is a flowchart showing the flow of the processes performed by the compiler according to the third embodiment. FIG. 14 is different from FIG. 4 according to the first embodiment in that Step S103 is replaced by Step S301. That is, the determine unit 213 obtains, as the test set, a combination including, by 90% or more, the division IDs included in the union specified in Step S102, out of the combinations of the test IDs (S301). Specifically, the determine unit 213 refers to the test-resource correspondence table 14, and obtains a union of the division IDs for every combination of the test IDs. Then, the determine unit 213 narrows the obtained unions to include the division IDs included in the union calculated in Step S102 by 90% or more (to obtain the candidate(s) of the test set). Here, when a plurality of unions correspond to the test set candidates, the above-described smallest set is determined as the test set.

<Specific Example>

Figure 15:
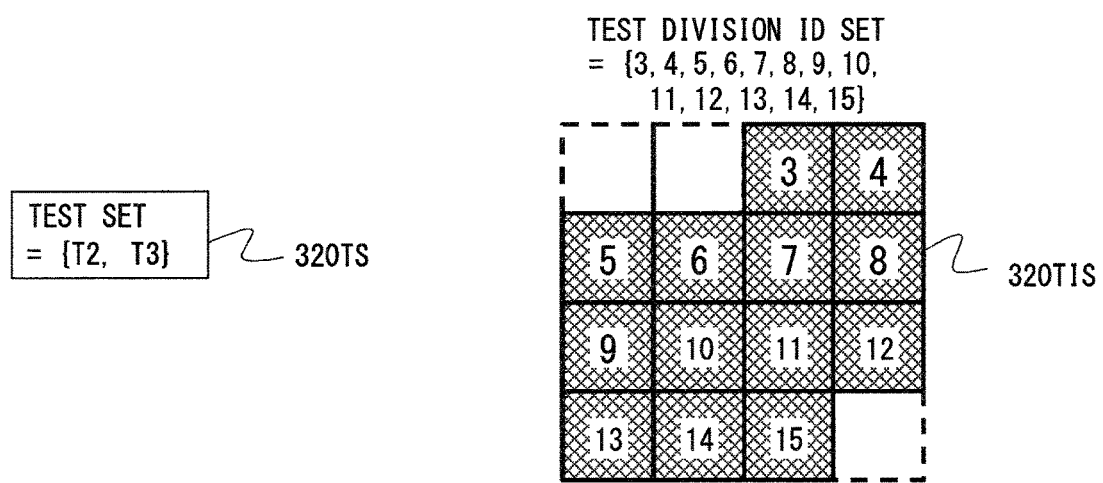
FIG. 15 is a diagram showing an example of a test set according to the third embodiment.

FIG. 15 is a diagram showing an example of the output test set according to the third embodiment. Firstly, it is assumed that, in Step S101, similarly to the first embodiment, the instruction string 120 shown in FIG. 9 is included in the object program 12 generated by the compile unit 211. Then, in Step S102, similarly to the first embodiment, the specify unit 212 obtains the union (the use resource group) 120US.

Here, in Step 301, the determine unit 213 obtains a test set 320TS shown in FIG. 15 as the smallest set. The test division ID set of the diagnosis target apparatus 22 derived from the test set 320TS is 320TIS. In this example, 13/16 is subjected to the self diagnosis in the diagnosis target apparatus 22. Here, the number of division IDs corresponding to the regions actually used when the diagnosis target apparatus 22 executes the object program 12 is 14. Accordingly, against the actually used regions, 13/14=93% is examined.

<Effect of Third Embodiment>

As described above, the third embodiment is characterized in use of the threshold value in obtaining the smallest set. Thus, the test set can further be made smaller. As a result, the process time of the self diagnosis program can further be reduced. Here, there are cases where the detection rate of 90% or more suffices as the functional safety. Accordingly, the present embodiment is extremely effective for the case where execution of just the test satisfying the detection rate of 90% suffices.

Note that, when the threshold value is 100% in the third embodiment, it is equivalent to the first embodiment. Therefore, the third embodiment can also be regarded as an embodiment including the first embodiment.

(Fourth Embodiment)

A fourth embodiment is a variation of the first or third embodiment. In the fourth embodiment, out of the test set candidates, a combination that provides the smallest expected value of the self diagnosis execution time is determined as the target resource group. That is, in the case where a plurality of combinations including the resources belonging to the use resource group by a prescribed proportion exist in the combinations of the plurality of functional blocks, based on an expected value of the self diagnosis execution time previously registered for each of the plurality of functional blocks, a combination providing the smallest sum of the expected values of the execution time is determined as the target resource group, out of the existing plurality of combinations. This is because the self diagnosis execution time is not simply determined by the number of resources being the targets of the self diagnosis. That is, among the test set candidates, one candidate may provide the shortest execution time though the number of division IDs of that candidate is not the smallest. Hence, the fourth embodiment is particularly effective when correlation between the number of resources and the execution time is low.

<Structure of Compiler>

Figure 16:
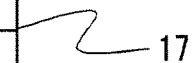
FIG. 16 is a diagram showing an example of a correspondence table of test IDs and execution time expected values according to a fourth embodiment.

The compiler 210 according to the fourth embodiment can be realized by modifying the determine unit 213. It is assumed that the expected value of the self diagnosis process execution time for each test ID is previously registered. FIG. 16 is a diagram showing an example of a correspondence table 17 between the test IDs and the execution time expected values according to the fourth embodiment. Note that, it is also possible that the self diagnosis process execution time expected values in the regions defined by the division IDs are previously recorded, and an expected value of the total time is calculated after the test set candidates are narrowed. Further, it is assumed that the threshold value of an arbitrary value has already been set.

<Process Flow>

Figure 17:
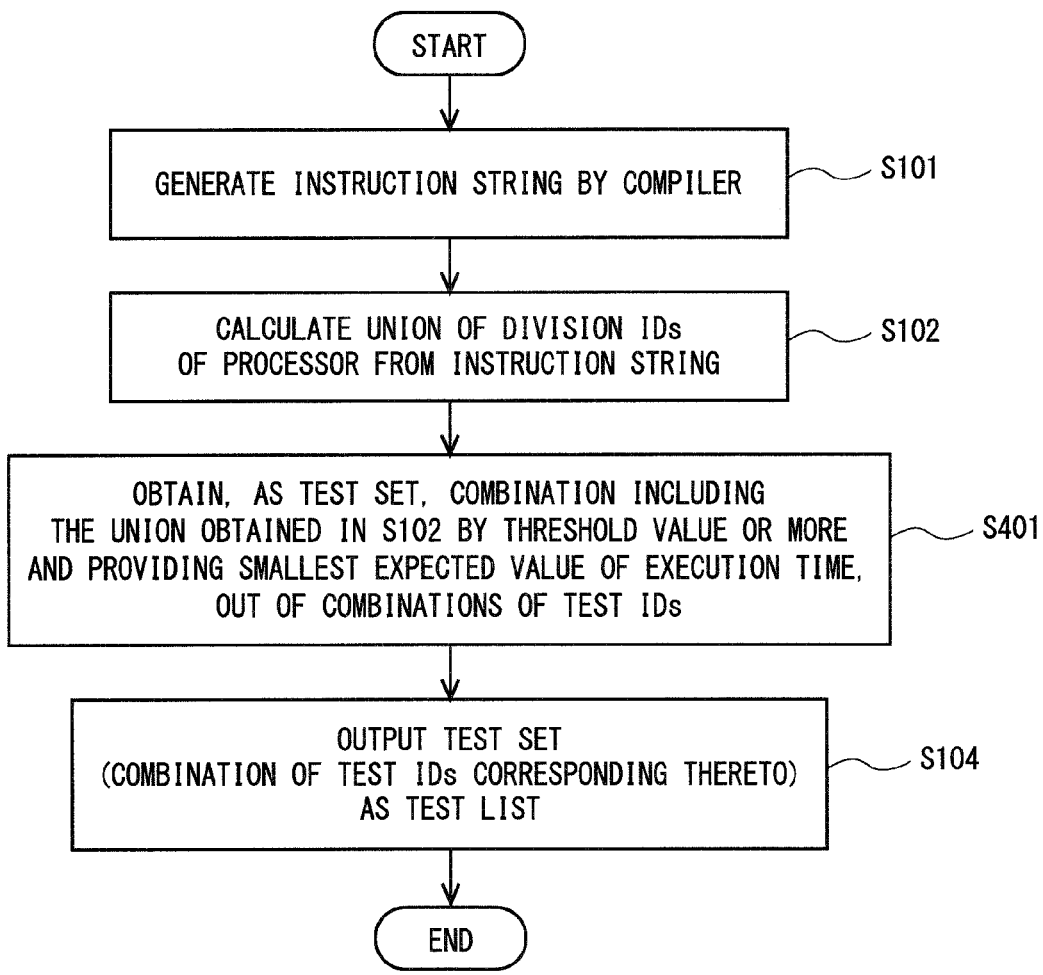
FIG. 17 is a flowchart showing the flow of the processes performed by a compiler according to the fourth embodiment.

FIG. 17 is a flowchart showing the flow of the processes performed by the compiler according to the fourth embodiment. FIG. 17 is different from FIG. 8 according to the first embodiment in that Step S103 is replaced by Step S401. That is, the determine unit 213 determines, out of the combinations of the test IDs, a set that includes division IDs included in the union specified in Step S102 by a threshold value or more and that provides the smallest execution time expected value, as the test set (S401). Specifically, the determine unit 213 refers to the test-resource correspondence table 14, and obtains a union of the division IDs for every combination of the test IDs. Then, the determine unit 213 narrows the obtained unions to include the division IDs included in the union (the use division ID set) calculated in Step S102 by a threshold value or more (to obtain the test set candidate(s)). Here, it is assumed that a plurality of unions correspond to the test set candidates.

Subsequently, the determine unit 213 refers to the correspondence table 17 shown in FIG. 16 for each of the test set candidates, and determines the one that provides the smallest execution time expected value as the test set. Alternatively, in the case where the expected value of the self diagnosis process execution time for each of the regions is previously registered, the determine unit 213 may calculate, for each of the test set candidates, the execution time expected value by calculating the sum of the corresponding execution time expected values of the self diagnosis process.

<Specific Example>

FIG. 18 is a diagram showing an example of the output test set according to the fourth embodiment. Firstly, in Step S101, it is assumed that the instruction string 170 of the object program 12 is generated by the compile unit 211. Then, in Step S102, the specify unit 212 refers to the instruction-resource correspondence table 13, and specifies that the division IDs used by the instruction opB and the instruction opE of the instruction string 170 are {3, 4, 7, 8, 11, 12} and {13, 14, 15}, respectively. Accordingly, the specify unit 212 obtains a union of {3, 4, 7, 8, 11, 12} and {13, 14, 15}, to specify {3, 4, 7, 8, 11, 12, 13, 14, 15} as a set 170US.

Subsequently, in Step S401, the determine unit 213 narrows the test set candidates including the use division ID set 170US among the combinations of the test IDs to a set A {T2, T3} and a set B {T3, T4}. Specifically, the division ID set of the set A {T2, T3} is {3, 4, 5, 6, 7, 8, 9, 10, 11, 12, 13, 14, 15}. Further, the division ID set of the set B {T3, T4} is {3, 4, 7, 8, 11, 12, 13, 14, 15, 16}. That is, both the set A and the set B include the use division ID set 170US.

Then, as indicated by reference character 171, the determine unit 213 obtains the execution time expected values of the set A and set B. Specifically, the execution time expected value of the set A is 25 nsec from the sum of the execution time expected values of the test IDs T2 and T3. Further, the execution time expected value of the set B is 35 nsec from the sum of the execution time expected values of T3 and T4. Here, the set B is smaller in the number of the division IDs, but the set A is smaller in the sum of the execution time expected values. Hence, the determine unit 213 according to the fourth embodiment determines the set A as the target resource group.

<Effect of Fourth Embodiment>

As described above, in the fourth embodiment, in the case where there are a plurality of test set candidates, the one that provides the smallest expected value of the self diagnosis execution time is selected. This is because the self diagnosis time may vary depending on the test content even with the identical region, and the self diagnosis execution time may not always be the simple sum of the execution times of the division IDs. For example, a multiply add instruction, a multiply instruction, and an add instruction provide different execution times depending on the value. Thus, the processing time of the self diagnosis program can be further reduced.

(Fifth Embodiment)

A fifth embodiment is a variation of the first or third embodiment. In the fifth embodiment, out of the test set candidates, a combination that includes a greater number of regions having a high significance degree is determined as the target resource group. That is, in the case where a plurality of combinations including the resources belonging to the use resource group by a prescribed proportion exist in the combinations of the plurality of functional blocks, based on a functional significance degree previously registered for each of the plurality of functional blocks, a combination providing a greater sum of the significance degrees is determined as the target resource group, out of the existing plurality of combinations. Thus, a further effective self diagnosis can be preferentially executed.

<Structure of Compiler>

The compiler 210 according to the fifth embodiment can be realized by modifying the determine unit 213. It is assumed that the significance degree for each division ID is previously registered. FIG. 19 is a diagram showing an example of a correspondence table 18 between the division IDs and the significance degrees according to the fifth embodiment. As shown by the correspondence table 18, to each division ID, a significance degree is set depending on the transistor or the function in the corresponding region. Here, the significance degree is the magnitude of an influence of a failure. For example, a control-related failure may greatly change the process flow, and greatly influences continuation of the process. On the other hand, though a data-related failure changes a calculation result, the processing order or the like is unlikely to change. Therefore, in some cases, a data-related failure can be handled as a calculation error, and the influence by the failure is small. As described above, the influence degree is different by the point where a failure occurs. Therefore, the significance degree of the test by the region is also different.

Further, it is assumed that the threshold value of an arbitrary value has already been set. Note that, in the following description, though the threshold value will be described to be 80%, the threshold value is not limited thereto.

<Process Flow>

Figure 20:
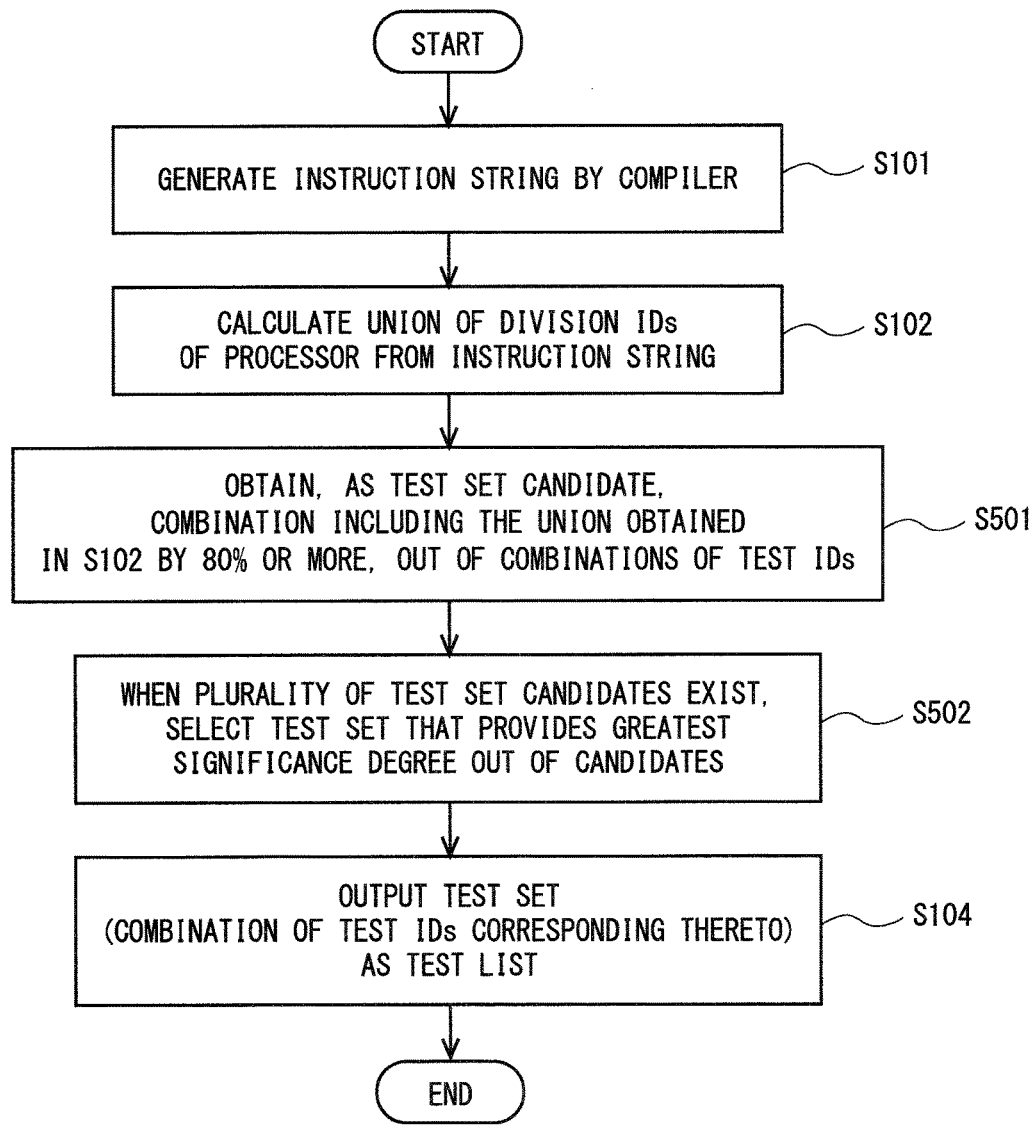
FIG. 20 is a flowchart showing the flow of the processes performed by a compiler according to the fifth embodiment.

FIG. 20 is a flowchart showing the flow of the processes performed by the compiler according to the fifth embodiment. FIG. 20 is different from FIG. 14 according to the third embodiment in that Step S301 is replaced by Step S501, and that Step S502 is added to follow Step S501.

The determine unit 213 obtains, as the test set, a combination including, by 80% or more, the division IDs included in the union specified in Step S102, out of the combinations of the test IDs (S501). Subsequently, when a plurality of test sets are obtained in Step S501, the determine unit 213 selects a combination having the greatest significance degree out of the plurality of combinations (S502). Specifically, the determine unit 213 refers to the correspondence table 18 of FIG. 19 for each of the test set candidates, and calculates the sum of the significance degrees. Then, the determine unit 213 determines, out of the test set candidates, the set whose sum of the significance degrees is the maximum as the test set.

<Specific Example>

FIG. 21 is a diagram showing an example of the output test set according to the fifth embodiment. Firstly, in Step S101, it is assumed that an instruction string 180 of the object program 12 is generated by the compile unit 211. Then, in Step S102, the specify unit 212 refers to the instruction-resource correspondence table 13, and obtains a union of the division IDs used by the instruction string 180 (the use division ID set 180US) by the following Mathematical Expression (1).

$$\text{Use division ID set} = opB \cup opD \cup opF \cup opC \quad (1)$$
$$= \{3, 4, 7, 8, 11, 12\} \cup \{9, 10, 13, 14\}$$
$$\cup \{14, 15, 16\} \cup \{10, 11, 14, 15\}$$
$$= \{3, 4, 7, 8, 9, 10, 11, 12, 13, 14, 15, 16\}$$

Subsequently, in Step S501, the determine unit 213 obtains a set C {T2,T3} indicated by reference character 181 and a set D {T3,T4} indicated by reference character 182, as the test set candidates including the use division ID set 180US by 80% or more.

Then, the determine unit 213 obtains an effective division ID set C2 from the intersection of a test division ID set C1 of the set C and the use division ID set 180US. Here, the effective division ID set is a portion of the test division ID set that is actually used by the object program 12, and is a set of the division IDs to which the test is actually effective.

Comparing the effective division ID set C2 of the set C and the use division ID set 180US against each other, the set C2 does not include the division ID "16". That is, the use division ID set 180US includes the division IDs included in the set C2 by a proportion of 11/12=91%.

Then, the determine unit 213 calculates the sum of the significance degrees of the correspondence table 18 from the division IDs included in the effective division ID set C2, to calculate the significance degree of the set C. Here, it is assumed that the significance degree of the set C is "390".

From the similar procedure, the set D does not include division IDs "9" and "10". That is, the division ID set 180US includes the division IDs included in the set D2 by a proportion of 10/12=83%. Further, it is assumed that the significance degree of the set D is "400".

Accordingly, in Step S502, the determine unit 213 selects the set D having a higher significance degree as the target resource group. Here, the significance degree of the division ID "16" not executed in the set C is "60", and the sum of the significance degrees of the division IDs "9" and "10" not executed in the set D is 30+20=50. Accordingly, since the division ID "16" is more significant, the set D including the division ID "16" is selected.

<Effect of Fifth Embodiment>

As described above, the fifth embodiment is characterized in that, in the case where the test set is reduced using a threshold value, the test is selected according to the significance degree of the portion being the target of the test. Thus, at the same failure detection rate, the influence of a failure occurrence can be reduced.

(Other Embodiment)

The second embodiment can be carried out in combination with any of the third to fifth embodiments. Further, the fourth embodiment can be carried out in combination with the third embodiment.

Note that, the embodiments described above are each a self diagnosis method, and can be regarded also as a compile method or a method for determining a diagnosis target.

Note that, the present embodiment can also be expressed as follows. That is, in compiling the user program, a logic circuit of a used processor is examined by a generated instruction string, and solely to-be used resources are inspected in executing a self diagnosis program. Since solely the resources to be used by the user program are inspected, the self diagnosis time can be reduced.

Further, it goes without saying that the present invention is not limited to the embodiments described above, and various changes can be made in the range not departing from the spirit of the present invention set forth above. For example, though the embodiments the have been described in hardware structures, the embodiments of the present invention are not limited thereto. The embodiments can also realize the processes described above by causing a CPU (Central Processing Unit) to execute a computer program.

In the example described above, a program can be stored using various types of non-transitory computer readable media, and supplied to a computer. The non-transitory computer readable media include various types of tangible storage media. Exemplary non-transitory computer readable media include magnetic recording media (e.g., flexible disks, magnetic tapes, hard disk drives), magneto-optical recording media (e.g., magneto-optical discs), CD-ROM (Read Only Memory), CD-R, CD-R/W, DVDs (Digital Versatile Discs), BDs (Blu-ray (registered trademark) Discs), semiconductor memory (e.g., mask ROM, PROM (Programmable ROM), EPROM (Erasable PROM), flash ROM, RAM (Random Access Memory)). The program may be supplied to a computer by various types of transitory computer readable media. Exemplary transitory computer readable media include electric signals, optical signals, and electromagnetic waves. A transitory computer readable medium can supply such a program to a computer via wired communication path such as an electrical wire and an optical fiber, or via a wireless communication path.

Note that, the present invention is not limited to the embodiments described above, and can be changed as appropriate in a range not departing from the spirit of the present invention. Part of or all the foregoing embodiments can be described as in the following Supplementary Note, but the present invention is not limited thereto.

(SUPPLEMENTARY NOTE)

A self diagnosis system including:

a diagnosis target unit that has a plurality of resources and executes an object program;

a specify unit that specifies, out of the plurality of resources, a use resource group being a set of resources used by an instruction string included in the object program; and a determine unit that determines, in accordance with the specified use resource group, a target resource group being a set of resources to be targets of a self diagnosis in the diagnosis target unit, wherein the diagnosis target unit executes the self diagnosis on the determined target resource group before execution of the object program.

In the foregoing, while the specific description has been given of the invention made by the inventor based on the embodiments, it goes without saying that the present invention is not limited to the embodiments already described above, and various changes can be made in the range not departing from the spirit of the present invention.

While the invention has been described in terms of several embodiments, those skilled in the art will recognize that the invention can be practiced with various modifications within the spirit and scope of the appended claims and the invention is not limited to the examples described. above.

Further, the scope of the claims is not limited by the embodiments described above.

Furthermore, it is noted that, Applicant's intent is to encompass equivalents of all claim elements, even if amended later during prosecution.

The first, second, third, fourth and fifth embodiments can be combined as desirable by one of ordinary skill in the art.

What is claimed is:

1. A self diagnosis method comprising:

specifying, out of a plurality of resources included in a diagnosis target apparatus, a use resource group being a set of resources used by an instruction string included in an object program executed on the diagnosis target apparatus;

determining a target resource group corresponding to the use resource group, the target resource group being a set of resources to be targets of a self diagnosis in the diagnosis target apparatus; and executing the self diagnosis on the determined target resource group, wherein the target resource group is determined based on expected value of an execution time of the self diagnosis previously registered for each of a plurality of functional blocks corresponding to a plurality of functions in the diagnosis target apparatus.

2. The self diagnosis method according to claim 1, further comprising:

previously defining, on the plurality of resources, the plurality of functional blocks being a set of resources respectively corresponding to the plurality of functions in the diagnosis target apparatus; and determining, out of combinations of the plurality of functional blocks, the target resource group in accordance with the specified use resource group.

3. The self diagnosis method according to claim 2, further comprising determining, as the target resource group, out of the combinations of the plurality of functional blocks, a combination including all the resources belonging to the use resource group and still being made up of a smallest number of the resources.

4. The self diagnosis method according to claim 2, further comprising determining, as the target resource group, out of the combinations of the plurality of functional blocks, a combination in which a number of the resources not belonging to the use resource group is a smallest.

5. The self diagnosis method according to claim 2, further comprising determining, as the target resource group, out of the combinations of the plurality of functional blocks, a combination including the resources belonging to the use resource group by a prescribed proportion.

6. The self diagnosis method according to claim 5, further comprising, in a case where a plurality of the combinations including the resources belonging to the use resource group by a prescribed proportion exist in the combinations of the plurality of functional blocks, determining, as the target resource group, based on the expected value of the execution time of the self diagnosis previously registered for each of the plurality of functional blocks, a combination providing a smallest sum of the expected values of the execution time, out of the existing plurality of combinations.

7. The self diagnosis method according to claim 5, further comprising, in a case where a plurality of the combinations including the resources belonging to the use resource group by a prescribed proportion exist in the combinations of the plurality of functional blocks, determining, as the target resource group, based on a functional significance degree previously registered for each of the plurality of functional blocks, a combination providing a greater sum of the significance degrees, out of the existing plurality of combinations.

8. The self diagnosis method according to claim 2, further comprising:
   previously defining a plurality of program modules for performing the self diagnosis on the plurality of functional blocks, respectively;
   selecting, out of the plurality of program modules, a program module corresponding to the determined target resource group; and
   generating a self diagnosis program for executing the self diagnosis based on the selected program module.

9. The self diagnosis method according to claim 1, wherein the use resource group is specified by referring to a correspondence table in which a plurality of instructions defined on the diagnosis target apparatus and the set of resources used by the instructions are associated with each other.

10. The self diagnosis method according to claim 1, further comprising:
    compiling the object program; and
    determining the target resource group using the instruction string generated by the compiling.

11. The self diagnosis method according to claim 1, wherein the target resource group is further determined based on an execution characteristics of the plurality of functional blocks corresponding to the plurality of functions in the diagnosis target apparatus.

12. A compile apparatus comprising: a memory configured to store one or more instructions; and a processor configured to execute the one or more instructions to implement: a specify unit that specifies, out of a plurality of resources included in a diagnosis target apparatus, a use resource group being a set of resources used by an instruction string included in an object program executed on the diagnosis target apparatus;
    a determine unit that determines a target resource group corresponding to the use resource group, the target resource group being a set of resources to be targets of a self diagnosis in the diagnosis target apparatus; and
    an output unit that outputs, for causing the self diagnosis on the determined target resource group to be executed in the diagnosis target apparatus, information based on the target resource group to the diagnosis target apparatus,
    wherein the target resource group is determined based on expected value of an execution time of the self diagnosis previously registered for each of a plurality of functional blocks corresponding to a plurality of functions in the diagnosis target apparatus.

13. A non-transitory computer readable medium storing a compiler program for causing a computer to execute processes of:
    generating an object program executed on a diagnosis target apparatus;
    specifying, out of a plurality of resources included in the diagnosis target apparatus, a use resource group being a set of resources used by an instruction string included in the object program;
    determining a target resource group corresponding to the use resource group, the target resource group being a set of resources to be targets of a self diagnosis in the diagnosis target apparatus; and
    outputting, for causing the self diagnosis on the determined target resource group to be executed in the diagnosis target apparatus, information based on the target resource group to the diagnosis target apparatus,
    wherein the target resource group is determined based on expected value of an execution time of the self diagnosis previously registered for each of a plurality of functional blocks corresponding to a plurality of functions in the diagnosis target apparatus.

* * * * *